United States Patent

Gunnarsson

[11] Patent Number: 5,414,427
[45] Date of Patent: May 9, 1995

[54] DEVICE FOR INFORMATION TRANSMISSION

[76] Inventor: Staffan Gunnarsson, Svärdsliljevägen 62, S-162 43 Vallingby, Sweden

[21] Appl. No.: 961,939
[22] PCT Filed: Jul. 5, 1991
[86] PCT No.: PCT/SE91/00479
§ 371 Date: Jan. 21, 1993
§ 102(e) Date: Jan. 21, 1993
[87] PCT Pub. No.: WO92/01953
PCT Pub. Date: Feb. 6, 1992

[30] Foreign Application Priority Data

Jul. 24, 1990 [SE] Sweden .................. 9002493

[51] Int. Cl.⁶ .............................. G01S 13/80
[52] U.S. Cl. .............................. 342/51; 342/42
[58] Field of Search .................. 342/42, 44, 51

[56] References Cited

U.S. PATENT DOCUMENTS

| | | | |
|---|---|---|---|
| 4,242,661 | 12/1980 | Henoch et al. | |
| 4,390,880 | 6/1983 | Henoch. | |
| 4,442,590 | 4/1984 | Stockton et al. | 29/571 |
| 4,600,906 | 7/1986 | Blight | 333/205 |
| 4,673,936 | 6/1987 | Kotoh | 342/51 |
| 4,771,291 | 9/1988 | Lo et al. | 343/700 MS |
| 4,813,025 | 3/1989 | Rowland et al. | 367/6 |
| 4,855,749 | 8/1989 | DeFonzo | 343/767 |
| 4,893,126 | 1/1990 | Evans | 342/175 |
| 4,908,615 | 3/1990 | Bayraktaroglu | 340/917 |
| 4,926,187 | 5/1990 | Sugawara et al. | 342/361 |
| 4,933,680 | 6/1990 | Shapiro et al. | 343/700 MS |
| 5,001,492 | 3/1991 | Shapiro et al. | 343/700 MS |
| 5,025,247 | 6/1991 | Banks | 340/574 |
| 5,119,099 | 6/1992 | Haruyama et al. | 342/51 |
| 5,212,494 | 5/1993 | Hofer et al. | 343/859 |

Primary Examiner—John B. Sotomayor
Attorney, Agent, or Firm—Lowe, Price, LeBlanc & Becker

[57] ABSTRACT

A device for information transmission, a so-called transponder, for receiving a first microwave signal, modulating and coding, and retransmitting a second microwave signal, having at least one antenna made in microstrip technique is described. The device is characterized primarily in that the antenna has an antenna layer (20), acting towards a ground plane (21), the antenna layer and the ground plane essentially equal area, and in that the device further having a reflex position (23), arranged next to or at a distance of at most 1/6 of the air wave length of the first microwave signal from the edges of the antenna layer and the ground plane, so that an antenna lobe directional from the antenna is obtained, including directly transmitted microwave signal and reflected microwave signal. With this embodiment a device is obtained that is compact, effective, light and inexpensive and gives well defined and directional antenna lobe for communications with good range.

20 Claims, 4 Drawing Sheets

DEVICE FOR INFORMATION TRANSMISSION

The present invention relates to a device for information transmission, a so-called transponder, for receiving a first microwave signal, for modulation and coding, and for retransmitting a second microwave signal, comprising at least one antenna means made in microstrip technique.

BACKGROUND OF THE INVENTION

Using microwave technique for information transmission to and from transponders has been known for a long time and is described in inter alia U.S. Pat. Nos. 4,242,661 "Device for registration of objects" and 4,390,880 "Radio communication system and transmitter and receiver equipment therefor".

It is further known from U.S. Pat. No. 4,673,936 to integrate a microwave unit with a wrist watch, but that invention is intended as an emergency transmitter and comprises an active frequency sweeping microwave oscillator built into the watch and intended to be detected by a reconnaissance radar onboard a ship, thereby differing from the present invention in which no microwave oscillator in included, but in which information from the transponder is fetched through passive modulation and reflection of an illuminating microwave signal. In addition, the mentioned device uses an entirely different antenna technique than the one presented here.

In many applications simultaneous demands are placed on good range, directionality and compact dimensions in the transponder, while, at the same time, the transmission frequency, which determines the size of the antenna, is predetermined for technical reasons or due to authority regulations.

It is general for all antennae that their dimension in otherwise static conditions are in inverse proportion to their operational frequency. Thus, an antenna at e.g. 5 GHz has half the extension of a 2.5 GHz antenna.

Furthermore, the capability of the antenna to receive microwave radiation is directly proportional to its effective antenna area, and since a lower frequency antenna due to its larger physical dimensions has a larger antenna area (square meter), it is capable of detecting more power (Watt) if it is in a microwave field of a certain power density (Watt per square meter) than would a higher frequency antenna with the same direction characteristics.

A high-frequency antenna can per se be given an increased effective antenna area by grouping several smaller antenna means side by side, but then there is the disadvantage of greater complexity and in that its directionality increases unfavourably, because the transponder must be directed carefully at the write/read unit in order to obtain a good range.

A transponder with a large effective antenna area and few antenna means in proportion to its total physical area therefore gives great advantages in applications with simultaneously high demands on compactness, range and freedom of orientation at a given radiation level.

Usual transponder frequencies are 2.45 GHz and 5.72 GHz, as there are internationally provided frequency bands which are commonly used for identification systems. Also 24 GHz has been provided internationally but has not yet come into any practical use, foremost due to high costs and low range performance. 2.45 GHz is also used by microwave ovens and through their widely spread usage, among other things, it is anticipated that this frequency will remain publicly available in the foreseeable future.

The mentioned frequencies are sufficiently low to enable the use of inexpensive silicon semiconductors and microstrip solutions in the microwave circuits, at the same time as the requirements for mechanic precision in impedance determining microstrip elements are moderate. The frequency is, however, sufficiently high for printed microstrip antennae to be used, which makes thin and easily manufactured antenna designs possible.

A well designed transponder with microstrip antenna has usually a radiation diagram that has its principal direction in the normal plane of the antenna layer, outwards from the antenna layer, while its sensitivity in the opposite direction is considerably depressed provided that the transponder antenna has a ground plane whose extension is considerably larger than that of the antenna layer. In practical cases, e.g. in so-called patch antennae for identification tags, the extension of the ground plane is usually chosen to approximately double the size of the antenna layer in order not to cause problems with undesirable back lobe effects.

A problem will then be that the microstrip antennae in transponder applications with directionality demands require large mounting space, whereby the applications are limited to such cases where there is space for this ground plane. Often other transponder components as well, such as e.g. power supplying means, microwave circuits, diodes, integrated circuits and passive components, require a considerable mounting area. If the ground plane could be diminished the demands would be accentuated on alternative and more space saving modes of construction for the mentioned components.

A ground plane diameter smaller than about twice the diameter of the antenna layer disturbs the antenna diagram so that its back lobe increases gradually with decreasing ground plane. If, therefore, the size of the antenna layer has been chosen to about 2 cm, which is typical at 2.45 GHz frequency, and ceramic substrate with a relative dielectricity constant of about 10, the ground plane of the antenna should have at least 4 cm diameter in order to obtain a controlled directionality without back lobe.

When there is a backward lobe formed by a limited ground plane, a signal between the communication unit and the transponder antenna can also go via reflections in objects located behind or diagonally behind the antenna layer, which causes interference between direct and reflected signal with the risk of signal drop out in positions where reflected and direct signals vectorially cancel each other.

A problem has been that with known technique it has not been possible to integrate an inexpensive microwave transponder in compact applications, e.g. into wrist watches, within usual dimensions and weight, but one has been confined to systems operating with inductive technique where a coil in the watch is used as an antenna and where the range becomes extremely limited. With inductive technique it is neither possible to achieve the directionality that is possible with microwave technique, and it is difficult to achieve a high data transmission speed.

A microwave based product would otherwise be capable of solving many problems with electronic passage control, electronic payment etc. Applied to wrist watches the technique would provide for directionality, good range, high data transmission speed and power saving, whereby very available and safe systems could be built. Applied to 5.7 GHz frequency range and a ceramic substrate the diameter of the transponder will only be about one centimeter, which can be included without difficulty in a small ladies' watch.

In addition, as the cost for a microwave based write-/read unit is low, the applications could embrace most of the applications that are currently covered by magnetic cards, memory cards, microprocessor cards, various key systems and various ticket systems. In an embodiment with particularly high sensitivity to a received microwave signal the device could furthermore be used as a pager.

The most compact microwave based transponder systems that currently exist are transponders in credit card format, but these are usually carried in a wallet or pocket and thereby require to be taken out before access can occur. Furthermore, the risk of theft is obvious, as is the problem of losing the transponder.

For applications in material flow automation and traffic information applications antennae have been used hitherto with a more conventional design, with the antenna layer facing the direction of radiation and with a quite large ground plane. Although this has admitted great freedom in installing the transponders on an optional mounting area, e.g. in a car window, on a plastic palette etc. without any problem of multiple-way extension from appearing back lobe radiation, there are nevertheless many applications where it is always known that the transponder is going to be mounted on a metal plane, while on the same time there is a need for the transponder to be small. Some examples are given of identifying gas bottles and beer-cans, which must be identified on refilling and distribution.

On these products there is extremely little space available for the identity tags/escort memories, and in addition they have to be protected from the very rough treatment and chemical effects that occur when the products are handled, when at the same time there are quite high demands on range and safe identification also in dirty environments. A small transponder according to the invention would here make possible an automatic information handling around the material flow.

Another example is given on automatic reading of the mileage of a rental car. Today, this must be effected manually, while with a product according to the invention, integrated with an electronic mileage counter in the car wheel hub, with microwave technique it would be possible to perform the reading automatically. The space available at the wheel hub is very much limited, but could include a transponder for automatic remote reading according to the invention.

Although choosing higher microwave frequencies would make smaller dimensions in the transponder antenna possible, other limitations would come instead, such as size and cost of other components, difficulties with international frequency permissions and increased sensitivity to environmental factors such as waterfilm and dirt on the transponder.

THE OBJECT AND MOST IMPORTANT CHARACTERISTICS OF THE INVENTION

The object of the present invention is to provide a device for information transmission, a so-called transponder, of the kind mentioned in the introduction, that is compact, effective, light and inexpensive, and that gives a well-defined and directional antenna lobe for communication with a good range.

According to the invention such a device is characterized primarily in that the antenna means comprises an antenna layer, acting towards a ground plane, the antenna layer and the ground plane having principally equal area, and that the device further comprises a reflex means, arranged next to, or at a distance of at most 1/6 of the air wave length of the first microwave signal from, the radiating edges of the antenna layer, arranged to reflect the second microwave signal that goes out from the radiating edges of the antenna layer and the ground plane edges, so that an antenna lobe, directional from the antenna means, comprised of a directly transmitted microwave signal and a reflected microwave signal is obtained.

If the device is designed with the antenna layer and ground plane having equal area, equally large antenna lobes are obtained in the normal direction of the antenna layer, in both the forward and rearward directions. By arranging a reflex means in the described manner a directional antenna lobe is only obtained in the forward direction.

As already mentioned, there is a lower limit for the size of the ground plane in relation to the size of the antenna layer, because the back lobe increases with decreasing ground plane. As the object of the invention is to achieve a compact device, i.e. a transponder of the kind mentioned in the introduction, in practice, there is a certain limit upwards for the size of the ground plane in relation to the size of the antenna layer. According to this invention the relation lies between a first radius of a circle, circumscribing the antenna layer, and a second radius, circumscribing the ground plane in the interval 0.6 to 1.7.

In a preferred embodiment of the invention the transponder components with relatively large extension, such as power source and/or microstrip conductor, are positioned entirely or partly within the innermost of the cylinder walls that can be conceived to circumscribe the antenna layer or ground plane. Hereby further objectives to provide a compact device of the kind mentioned in the introduction are met. The design of the antenna means acts in the same direction, in the form of a patch antenna, which via a substrate of dielectric material interacts with a ground plane. The antenna means can also be formed as a single folded or double folded dipole antenna in microstrip technique, which via a substrate of dielectric material interacts with a ground plane. For space-saving purposes the microstrip conductors of the device can be located entirely or partly in openings within their antenna layer in order there to interact through the same substrate with the same ground plane as the antenna layer, in which arrangement there are no electric through-connections through the substrate.

The described embodiments entail that the weight can be kept low, because the described antenna means only requires a limited dielectric substrate, typically, only one fourth of the weight of a corresponding substrate in a conventional transponder. In addition, this advantage is gained that the microwave signal frequency can be kept relatively low, in the order of 2–6 GHz, which gives a relatively large antenna area compared with that which would have been available with a higher frequency with the same antenna diagram of the device.

Because the substrate is relatively expensive the use of a limited substrate is cost-saving. Since the device is of limited size a substrate with relatively low dielectricity constant can come into use, which otherwise would have entailed larger dimensions in a conventional transponder. The connection technique for the used electronic components is also simple in the device according to the invention.

The device according to the invention finds applications in many areas where a compact transponder is required. As to personally carried transponders the device can in an embodiment be arranged as a compact box, intended to be carried by a person in direct or close body contact. Thereby, the mentioned reflex means can be constituted by the bottom of the box, and/or be constituted by the persons's body surface. A particularly advantageous embodiment of the device according to the invention with this design consists in that the transponder has been integrated with a watch to be carried at a person's wrist, i.e. a wrist watch, whereby the mentioned reflex means can be constituted by the clock case and/or the person's wrist surface.

The integration with a watch creates many constructive possibilities within the scope of the invention. The ground plane can, for example, be formed integrated with the visible clock face, whereas the antenna layer and other components such as clockwork, power source, electronic components and microstrip conductors are located between the clock face and the clock case.

In a suitable embodiment of the invention a chip is used in common for controlling the clockwork of the watch or other time indicator located in the watch and storing a code which is unique for the watch, the chip contributing to the information transmission to and from the transponder. The transponder can be arranged to store or transmit, directly or indirectly, time functions inbuilt in the watch.

If the transponder is included in a system for pay control or the like, it can be suitable that an indicator means arranged on the device shows the result of transactions via the first and/or second microwave signal, such as balance and status information.

To increase safety against unauthorized use of the device according to the invention it can be arranged to admit certain transactions only during a predetermined time interval, initiated in a manner such that at least one operational means in the device has been acted upon, possibly in a manner which is specific for each watch.

Again with the object to increase safety in the use of the device it can be arranged to admit certain data transactions via the first and/or second microwave signal partly coded, for example according to DES or RSA, provided that the transponder is programmed with a corresponding algorithm.

In a practical embodiment of a personally carried device according to the invention, on receiving a first microwave signal, transmitting a code which is preprogrammed in the transponder, the device is arranged to give an acoustic signal and possible also visual information on an indicator means.

As to application on vehicles or for goods or goods carrier in the flow of materials the mentioned reflex means can often be a surface, particularly metallic surface, on which the device according to the invention is attached.

A possible application is to be found in the area of reading mileage in vehicles of a vehicle fleet. Hitherto this had to be done manually, whereas with a product according to the invention, applied to the vehicle wheel hub, combined with an electronic mileage counter in the vehicle wheel hub, automatic remote reading could be arranged.

DESCRIPTION OF THE DRAWINGS

The invention will now be described in more detail with reference to the accompanying figures, of which

DESCRIPTION OF EMBODIMENTS OF THE INVENTION

Figure 1:
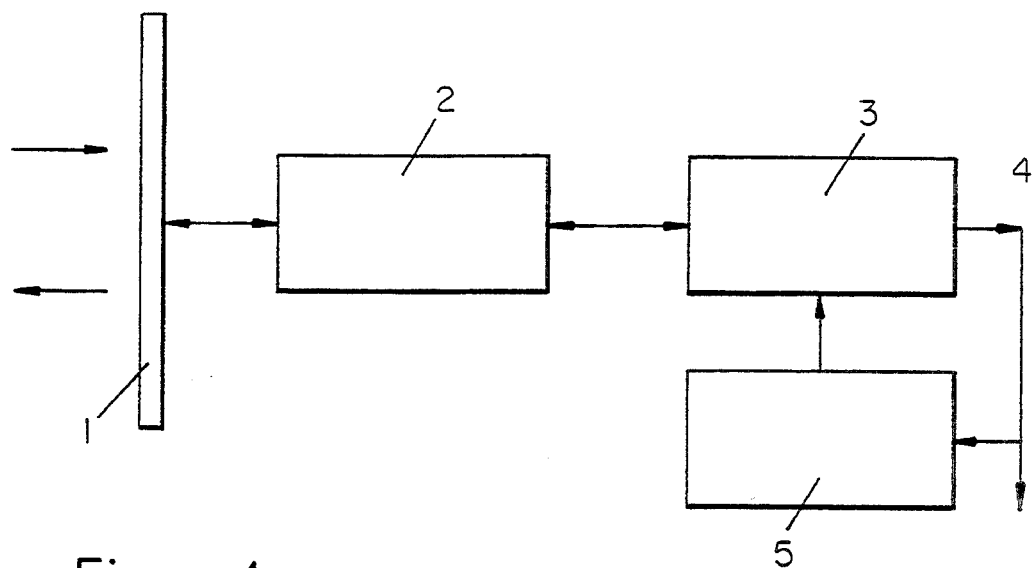
FIG. 1 shows a block diagram of a known device, i.e. a transponder.

FIG. 1 shows a block diagram of a known transponder for information transmission, for example an identification tag, and is based on the principle that an incoming microwave signal is modified and reflected.

The antenna 1 receive a microwave frequency, for example at 2.45 GHz, from an transmission/receiving unit and passes this signal onward to modulation circuits in the modulator-demodulator unit 2. Depending on the memory contents in the oscillator memory circuit 3 the modulator supplies information to the signal received by the transponder, and retransmits the modulated signal to the antenna 1, so that the information is radiated out into space in front of the transponder to the transmission/receiving unit so that it can read information from the transponder.

In the case where data is to be written in the transponder a modulated microwave signal is transmitted to the antenna 1, demodulated in the circuit 2 and stored in a memory in the oscillator memory circuit 3.

The modulator circuits are controlled from the oscillator with a signal with low frequency compared with the microwave signal, for example at 32768 Hz. An output signal 4 from the oscillator can also suitably be used for the time signalling of the watch. A power source in the unit 5 supplies the oscillator-memory circuit 3 with voltage, and can also comprise a clockwork if the invention is integrated with a watch.

Figure 2:
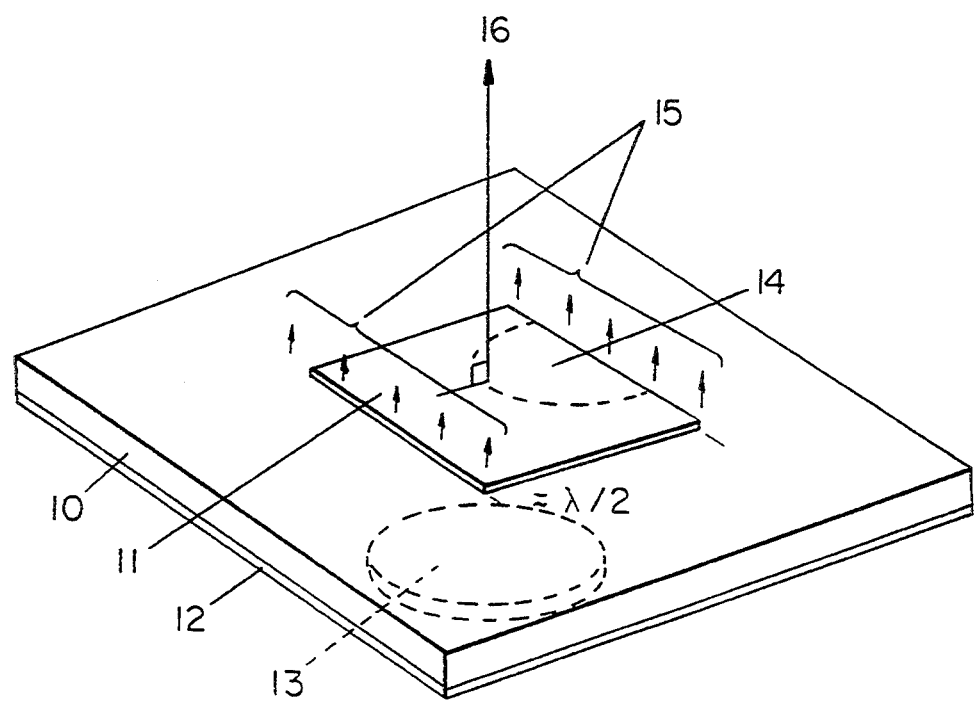
FIG. 2 shows a conventional microstrip antenna in perspective.

FIG. 2 shows a known conventional microstrip antenna, where a dielectric substrate 10 on one side has an antenna layer 11 of metal while a ground plane 12 of metal is located on the opposite side of the antenna layer. A battery 13 for the power supply of the transponder is located on the ground plane side, blocked out in the figure.

If an electric alternating voltage relative to the ground plane 12 is applied in or nearby the area 14 of the antenna layer, a standing wave will build up in the half-a-wave-length antenna in such a manner that radiation goes out from the electric field at the ends of the antenna layer, indicated by the arrows 15, so that a wave is transplanted in the normal direction 16 of the antenna. In the reverse situation the radiation coming in towards the antenna layer causes an alternating voltage in the area 14.

However, this is the case only if the ground plane 12 is considerably larger than the antenna layer 11, or else the antenna will also radiate in the opposite direction to the perpendicular 16.

Figure 3:
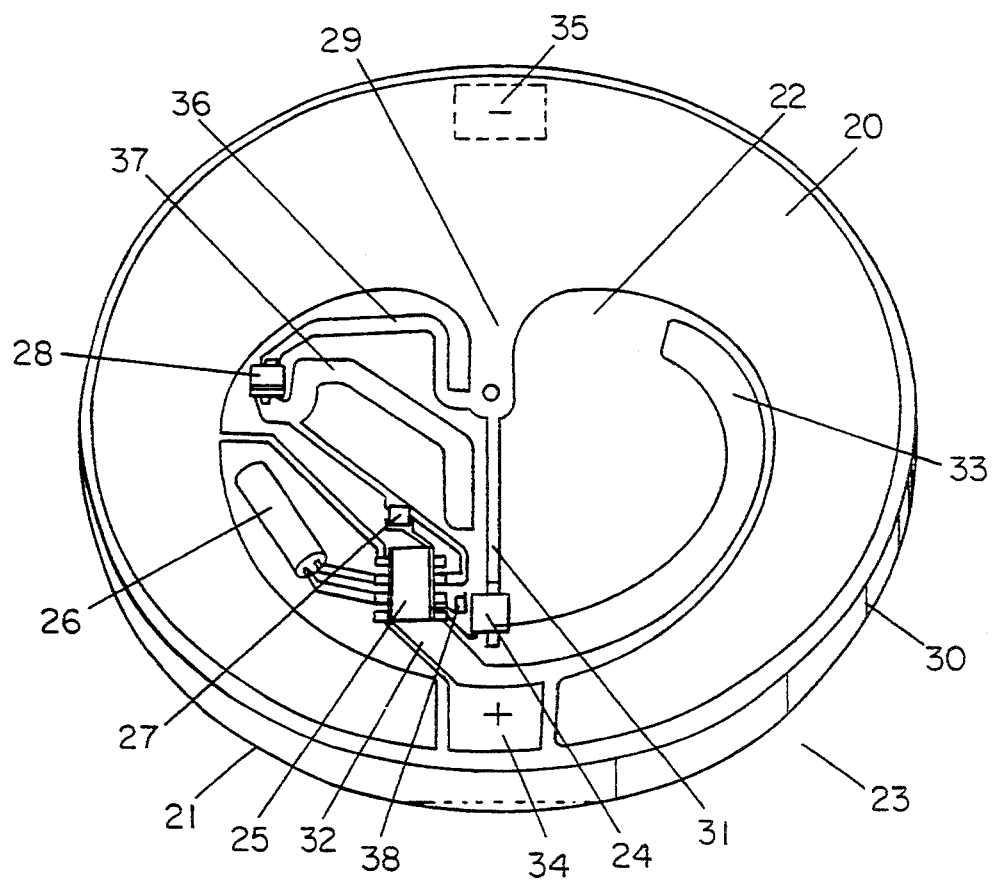
FIG. 3 shows a view of a device according to the invention.

FIG. 3 shows a transponder construction where an antenna patch 20 and a ground plane 21 are about the same size, and where an opening 22 has been made in the antenna layer to provide space for components and microwave circuits. This antenna type, if located in free space, will radiate about as much in both the directions of the perpendiculars. If, however, the antenna, as in the invention, is positioned nearby a reflection plane 23, typically smaller than one tenth of the air wave length from the antenna layer, the wave that is radiated out in the direction towards the reflection plane will be reflected in it and give a wave that interacts with the earlier described radiation out from the antenna layer. The exact proximity to the reflection plane is comparatively uncritical, which is why a transponder with a straight ground plane can be mounted without difficulty on a curved reflection surface.

It is to be noted that the radiation comes from the edges of the antenna layer, and that no real radiation is created directly from the central parts of the antenna layer surface. Therefore, this surface can be used for other purposes, for example to mount the circuits 25–26 in the opening 22 within the antenna layer 20, which circuits are required to achieve an electric modulation, by means of a modulator diode 24, with information in the feed point of the antenna layer 29 and to detect incoming signals with a detector diode 28.

It is also possible, without disturbing the antenna function, to place larger components such as a power source and the mechanic parts of a watch inside the radiating edge surfaces of the antenna layer. These details can for reasons of symmetry be located optionally on the same side as the components in FIG. 3 or on that side of the ground plane 21 which faces the reflection surface 23. The transponder provides the intended function irrespective of which of the surfaces 20 or 21 is positioned towards the reflection plane and irrespective of which side the power source or the mechanical parts of the watch are located on.

A signal received by the antenna layer 20 will give an electric alternating current field over the dielectric 30 towards the ground plane 21 in the feed point 29 of the antenna, which is located in, or besides, an area corresponding to the area 14 of the antenna layer in FIG. 2.

The received signal is conducted by the microstrip conductor 31 to a diode 24, whose impedance can be varied between different values depending on what voltage is put on its terminals. In the example of the embodiment there is an integrated circuit 25, which on its output terminal 32 emits a control voltage to the diode 24 which acts on its impedance. One side of the diode, from a microwave viewpoint, is short-circuited to the ground plane 21 by the open quarter-wave conductor 33, and thus, depending on the output voltage from the circuit 25, microwave-wise it will more or less connect the point 29 to the ground plane 21. The component 26 is a resonance element for an oscillator in the circuit 25, and is also suitably used for an oscillator in the circuit 25, and is also suitably used for the time keeping of the watch.

The above-described impedance variation in the diode 24 will cause that a wave front falling in towards the antenna layer 20 gives rise to a reflex modulated with information, whereby instantaneous phase position and amplitude are affected by the impedance in the diode 24. Because the circuit 25 is caused to hold data information that is allowed to affect the impedance of the diode 24, for example by varying the frequency or the phase in an alternating voltage on the output terminal 32 in a manner representative of data information, a transponder has been achieved whose data at radiation can be read with the aid of an external communication unit. The communication unit is caused to receive and decode the signal that is reflected from the transponder and modulated with data.

The connections 34 and 35 feed voltage to the transponder circuits from a power source, which is not shown in FIG. 3. Connection 34 has, because of space, been located in a cut in the external edge of the antenna layer 20, but this is of no importance for the function of the antenna because the antenna has a minimum of current in this point.

From an output terminal 38 on the circuit 25 second pulses are fetched for controlling the clockwork of a watch.

The diode 28 can be used for the amplitude detection of a signal that falls into the transponder, which signal, if it represents a data current to the transponder, makes it possible to write data into the circuit 25. The data signal reaches the circuit 25 via the capacitor 27, while the direct conductor between the circuit 25 and detector diode 28 is used to bias the diode.

One further use of the diode 28 is as a rectifier of microwave pulses to be used to supply power to the transponder instead of, or as a complement to, its inbuilt power source.

Furthermore, the antenna layer can be provided with an additional feed point so that the transponder, in a known manner, can function simultaneously in two polarisations orthogonal to each other.

In the case where it is desired to have a stronger reflected signal than can be achieved with the hitherto described device, it is also possible that the device receives a signal in one polarisation and retransmits the reflex in the other polarisation after modulation and amplification. Because the polarisations for reception and amplified retransmitted signal are separate, the risks of crosstalk and self-oscillation are avoided.

The antenna layer opening can also be formed assymmetrically in various manners in order, for example, to make the transponder polarisation circular.

It is also possible to use one of the diodes for writing in data in the transponder and the other diode for reading via two orthogonally polarised channels, independent of each other. Alternatively, one of the diodes can be used for rectification of incoming power supplying signals in the microwave area.

The diodes can also be integrated with the circuit 25. The modulation circuits can also be formed in other ways, for example, by complementing or replacing the diode 24 and the microstrip conductor 33 by other components.

In order to avoid demands for the transponder to be oriented in any specific manner relative to the rotational axis from the transmitter/receiver, it can be designed for transmission and reception of circularly polarised waves. The transponder, if it is linearly polarised, will in this case still be capable of being turned about said axis without signal drop out, as a circularly polarised wave comprises E fields in all directions at right angles from the direction of radiation.

An alternative embodiment of the transponder is to let the feed point 29 of the antenna layer, via a through-connection conductor, stand in connection with circuits located on the other side and on their own carrier. This solution can be used when there is a need for more space than is available in the opening 22 without the antenna function being disturbed.

Figure 4:
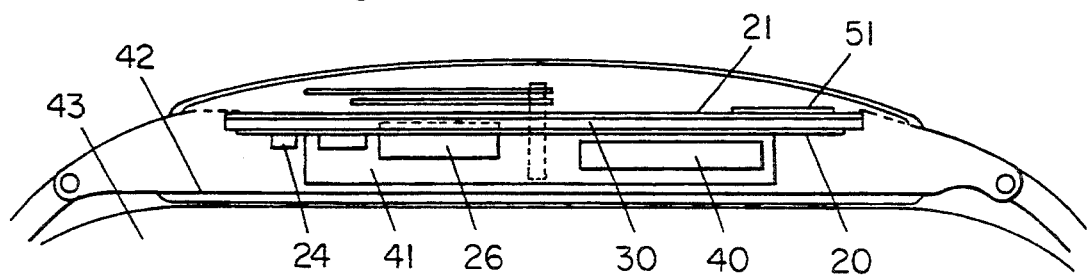
FIG. 4 shows a cross section of a device, integrated with a watch.

FIG. 4 shows the invention integrated with a wrist watch with the antenna layer 20 turned inwards toward the wrist and where the transponder and its ground plane 21 constitute a unit integrated with the clock face. In a manner described earlier, what remains of the signal towards the watch case 42 and the wrist 43 will after reflection interact with the direct radiation out from the transponder.

Battery 40, clockwork 41, electronic circuits and microwave circuits are mounted on the side of the antenna layer, inside the external limiting line of the antenna layer.

Figure 5:
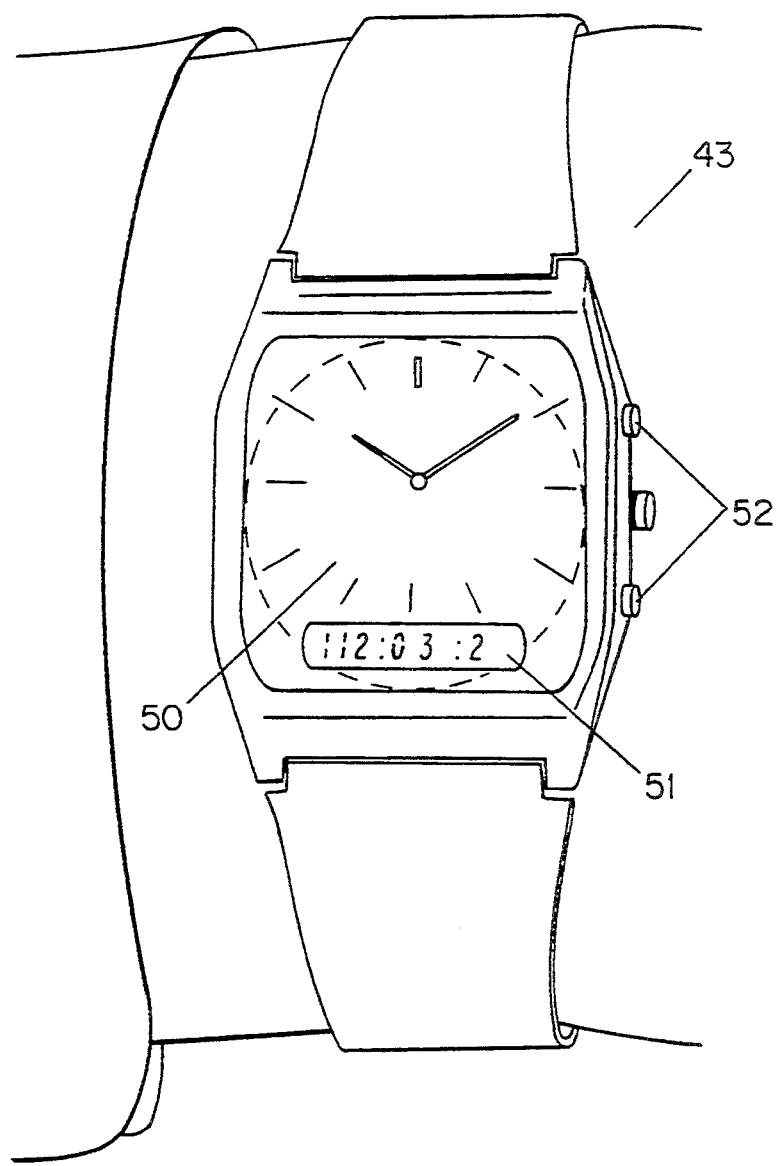
FIG. 5 shows, in perspective, the device according to FIG. 4 in the form of a wrist watch on a wrist.

FIG. 5 shows a view of a wrist watch, where, for example, the ground plane and clock face constitute an integrated unit 50. An indicator 51 can, besides showing the time, give indications that are related to information transmission, memory contents, status and other information.

Integrated with functions of similar type that is used in transaction cards, for example according to ISO 7816, transactions can be effected with a wrist mounted transponder, and in addition the result can be displayed on an indicator 51 that is controlled from the electronic circuits of the watch.

In simpler applications the transponder can be designed to store information according to the widely spread standards that apply to many credit cards and tickets with magnetic strips, and in many applications directly replace these in that the magnetic card reader is replaced by a microwave based write/read unit for the transponder.

Unauthorized access to the transponder can be prevented in that its function is normally locked. Release can be effected in that one or more operational means 52 on the wrist watch are acted upon, possibly in a manner which is specific for the watch.

In the case where a very high degree of security is required, e.g. if the device is to store value related information, such as electronic punches or money, it can be provided with means that provides sufficient safety against unauthorised access. This can be effected in a similar manner as that used for pay cards of magnetic strip type, for electronic memory cards or for microprocessor cards. In the latter case a microprocessor with coding functions, for example the standardized DES and RSA algorithms, are implemented.

The antenna layer can also be given another embodiment, for example rectangular, without having its function principle altered. Furthermore, other antenna types than patch antennae can be chosen, e.g. with greater band width but somewhat less effective microstrip dipoles. The advantage with such a type of antenna could be that it can be made to function at the same time at 2.45 and 5.7 GHz.

Figure 6:
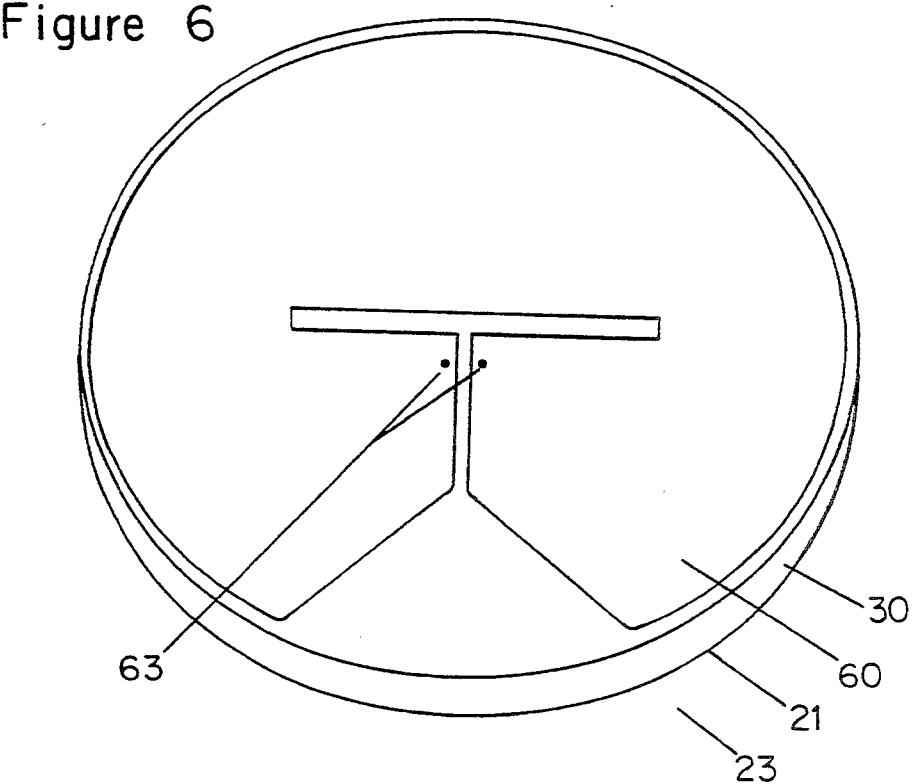
FIG. 6 and 7 show views of alternative embodiments of the antenna means according to the invention.

FIG. 6 shows such an embodiment where the antenna layer is constituted by a folded dipole on the ground plane in microstrip technique, which in its function partly resembles the patch antenna. The dipole element is constituted by the metal surface 60 which via a dielectric substrate 30 stands in connection with a ground plane 21, and where the unit is mounted on a reflected surface 23. The modulation of an incoming microwave signal is effected with the aid of components which are connected to the antenna layer in the feed points 63 in a similar manner as has been described earlier.

Figure 7:
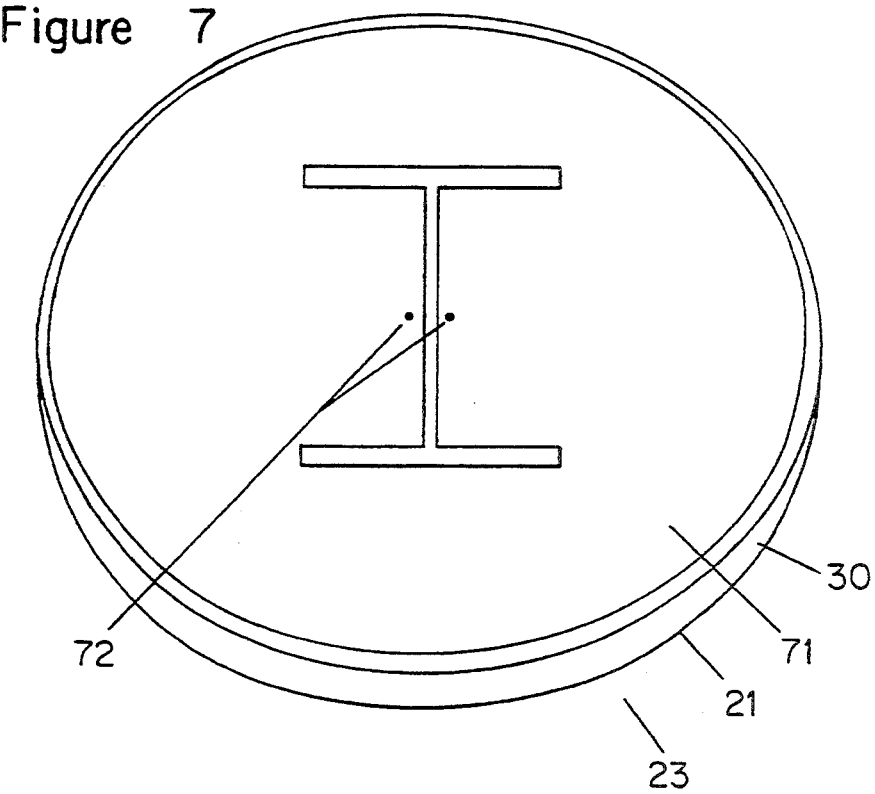

FIG. 7 shows an alternative embodiment of the transponder where an array 71 of two folded microstrip dipoles acts towards the ground plane 21. The microwave signal is connected in the feed points 72 and the unit is mounted on a reflecting surface 23.

The device can also be provided with a more sensitive receiver than with the diode detector 28 that has been shown in earlier examples of embodiments, and can be formed to act on an acoustic means integrated in a known way with the watch, being used for microwave based pager applications, whereby on receiving a special code via the microwave link it emits an observation signal to the carrier and possibly shows related information on the indicator.

The invention is not limited to the examples of embodiments as described here, and can be varied within the scope of the presented claims.

I claim:

1. A device for information transmission for receiving a first microwave signal, remodulating and coding said first microwave signal to produce a transponder signal, and retransmitting said transponder signal as a second microwave signal, said device comprising:

a ground plane;

at least one microstrip antenna including an antenna layer acting towards said ground plane, said antenna layer and said ground plane having substantially equal areas; and a reflex means, arranged adjacent to or at a distance of less than 1/6 of the air wave length of the first microwave signal from the radiating edges of said antenna layer, said reflex means arranged to reflect the second microwave signal radiating from the radiating edges of said antenna layer and edges of said ground plane so as to generate an antenna lobe, directional from said microstrip antenna comprising a directly transmitted microwave signal and a reflected microwave signal.

2. A device according to claim 1, characterized in that the relation between a first radius of a circle, circumscribing the antenna layer and a second radius of a circle, circumscribing the ground plane, lies in the interval 0.6 to 1.7.

3. A device according to claim 1, characterized in that the transponder components with relatively large extension, such as power source and/or microstrip conductors entirely or partly are located within the innermost of the cylinder walls that can be conceived to be circumscribed by the antenna layer or ground plane.

4. A device according to claim 1, characterized in that the antenna means consists of a patch antenna (20), which via a substrate of a dielectric material (30) interacts with a ground plane (21).

5. A device according to claim 1, characterized in that the antenna means consists of a single (60) or double (71) folded dipole antenna, which via a substrate of a dielectric material (30) interacts with a ground plane (21).

6. A device according to claim 1, characterized in that its microstrip conductors (31, 33, 36, 37) are placed entirely or partly in one or more openings (22) within the antenna layer (20) of the device and thereby interact through the same substrate (30) with the same ground plane (21) as the antenna layer (20), in which arrangement there are no electric through-connections through the substrate (30).

7. A device according to claim 1, characterized in that the device is designed as a compact box, intended to be carried by a person in direct or close body contact.

8. A device according to claim 7, characterized in that said reflex means consists of the bottom of the box.

9. A device according to claim 7, characterized in that said reflex means consists of said person's body surface.

10. A device according to claim 7, characterized in that the transponder has been integrated with a watch to be carried at a person's wrist, said reflex means consisting of the clock case.

11. A device according to claim 7, characterized in that the transponder has been integrated with a watch to be carried at a person's wrist, said reflex means consisting of the person's wrist surface.

12. A device according to claim 10, characterized in that the ground plane (21) has been formed integrated with the visible clock face and that the antenna layer and other components such as clockwork (41), power source (40), electronic components (24, 26) and microstrip conductors (31, 33, 36, 37) have been positioned between the clock face and the clock case.

13. A device according to claim 10, characterized in that a chip is used in common for controlling the clockwork (41) or other time indicator in the watch in order to store a code which is unique for the watch, and contributing to the information transmission to and from the transponder.

14. A device according to claim 10, characterized in that the transponder is arranged to store and/or transmit, directly or indirectly, time functions inbuilt in the watch.

15. A device according to claim 7, characterized in that it indicates the result of transactions on at least one indicator means (51) via the first and/or second microwave signal, such as balance and status information.

16. A device according to claim 7, characterized in that it is arranged to admit certain transactions only during a predetermined time interval, initiated by at least one operational means (52) in the device being acted upon, possibly in a manner which is specific for the watch.

17. A device according to claim 7, characterized in that the device is arranged to admit certain data transactions via the first and/or second microwave signal entirely or partly coded, for example according to DES or RSA.

18. A device according to claim 7, characterized in that, on receiving a first microwave signal transmitting a code which is preprogrammed in the transponder, it is arranged to give an acoustic signal and possibly also give visual information on at least one indicator means (51).

19. A device according to claim 1, characterized in that said reflex means consists of a surface, especially of metal, on which the device is attached.

20. A transponder comprising:
a ground plane;
an antenna including an antenna layer acting towards said ground plane, said antenna layer and said ground plane having substantially equal areas, for receiving a first microwave signal and transmitting a second microwave signal; and
remodulating and coding means, coupled to said antenna, for remodulating and coding said first microwave signal to produce a transponder signal for retransmission as the second microwave signal;
wherein said antenna further comprises a reflex means, arranged adjacent to or at a distance of less than 1/6 of the air wave length of the first microwave signal from the radiating edges of said antenna layer, said reflex means arranged to reflect the second microwave signal radiating from the radiating edges of said antenna layer and edges of said ground plane so as to generate an antenna lobe, directional from said antenna comprising a directly transmitted microwave signal and a reflected microwave signal.

* * * * *